United States Patent
Petitjean

(10) Patent No.: US 7,295,678 B2
(45) Date of Patent: Nov. 13, 2007

(54) METHOD FOR INSERTING BINARY MESSAGES IN A DIGITAL IMAGE

(75) Inventor: Guillaume Petitjean, Trets (FR)

(73) Assignee: STMicroelectronics S.A., Montrouge (FR)

(*) Notice: Subject to any disclaimer, the term of this patent is extended or adjusted under 35 U.S.C. 154(b) by 549 days.

(21) Appl. No.: 10/234,736

(22) Filed: Sep. 4, 2002

(65) Prior Publication Data

US 2003/0048924 A1 Mar. 13, 2003

(30) Foreign Application Priority Data

Sep. 4, 2001 (FR) ................................. 01 11433

(51) Int. Cl.
- *G06K 9/00* (2006.01)
- *G06K 15/00* (2006.01)
- *H04L 9/00* (2006.01)

(52) U.S. Cl. ................ 382/100; 380/54; 713/176; 358/3.28

(58) Field of Classification Search ................ None
See application file for complete search history.

(56) References Cited

U.S. PATENT DOCUMENTS

| | | | | |
|---|---|---|---|---|
| 3,984,242 A * | 10/1976 | Lamberts et al. | | 430/6 |
| 4,573,197 A * | 2/1986 | Crimmins | | 382/197 |
| 5,072,384 A * | 12/1991 | Doi et al. | | 382/132 |
| 5,629,770 A * | 5/1997 | Brassil et al. | | 358/426.12 |
| 5,956,420 A * | 9/1999 | Ikenoue | | 382/164 |
| 6,086,706 A * | 7/2000 | Brassil et al. | | 156/277 |
| 6,154,577 A * | 11/2000 | Warnick et al. | | 382/279 |
| 6,181,802 B1 | 1/2001 | Todd | | |
| 6,286,100 B1 | 9/2001 | Morimoto et al. | | |
| 6,345,104 B1* | 2/2002 | Rhoads | | 382/100 |
| 6,611,618 B1* | 8/2003 | Peli | | 382/154 |
| 6,785,409 B1* | 8/2004 | Suri | | 382/128 |
| 7,068,809 B2* | 6/2006 | Stach | | 382/100 |
| 2002/0015508 A1* | 2/2002 | Hannigan et al. | | 382/100 |
| 2002/0191812 A1* | 12/2002 | Kim | | 382/100 |
| 2004/0008866 A1* | 1/2004 | Rhoads et al. | | 382/100 |

OTHER PUBLICATIONS

French Search Report from French Patent Application No. 01/11433, filed Sep. 4, 2001.
Canny J.: "A Computational Approach To Edge Detection" IEEE Transactions on Pattern Analysis and Machine Intelligence, IEEE Inc. New York, US, vol. PAMI-8, No. 6, Nov. 1986, pp. 679-698.

* cited by examiner

*Primary Examiner*—Bhavesh M Mehta
*Assistant Examiner*—Charles Kim
(74) *Attorney, Agent, or Firm*—Lisa K. Jorgenson; James H. Morris; Wolf, Greenfield & Sacks, P.C.

(57) ABSTRACT

A method and a system for inserting at least one binary code in a digital image, including converting the code into a modification of contours of objects in the image.

10 Claims, 1 Drawing Sheet

METHOD FOR INSERTING BINARY MESSAGES IN A DIGITAL IMAGE

BACKGROUND OF THE INVENTION

1. Field of the Invention

The present invention relates to the insertion of codes or binary identification or authentication messages in digital images.

2. Discussion of the Related Art

A first example of application relates to the insertion of an identifier of the person entitled to the rights relative to the image, to enable detection of a possible piracy by distribution of illicit copies, or even going back to its source. A second example of application is the protection against set-ups deforming or falsifying the image, to guarantee the integrity of an image. The technique of binary code insertion in digital images is generally known as "watermarking" and has had a recent expansion with the rapid development of digital image transmission, especially over the Internet. Considering the increasing risk of illicit copies, the persons entitled to royalties, in particular, have searched for means to protect digital multimedia content.

The two above examples concern so-called security applications. Non-security applications may also be found, for example, the inserting of characteristics linked to the shooting or other information about the image.

Generally, the insertion of a code concerns each image. In the case of an animated sequence, all images then includes an insertion (for example, an identification code of the author is reproduced in all images). In this example, it is besides possible for the content of the respective codes to be linked to the sequence, to detect a possible image insertion or suppression.

Whatever the application, a so-called marking algorithm is used to encrypt and position in the image the codes to be inserted therein. An inverse algorithm is used to restore, according to the application, the identification, authentication codes, or the shooting characteristics, etc.

Conventionally, marking algorithms modify either certain pixels in the image, or certain coefficients in a transform of the image (Fourier transform, discrete cosine transform, etc.). The pixels or coefficients to be modified are generally selected by using a key specific to the user (the coder). The modifications may be, for example, an inversion of coefficient couples so that their values respect a relation depending on the value of the bit to be hidden, or a mere addition of the message to be hidden, previously modulated by Gaussian white noise.

The modification or coding often takes the form of an addition of a specific noise forming the hidden message. It is accordingly difficult to predict the influence of the modifications on the final image which may even, in certain cases, be visibly altered.

U.S. Pat. No. B1-6,181,802 discloses a method for marking digital images consisting in localizing the regions in which the information are coded at the level of the image contours. The shapes of the contours are not modified; they are not deformed. In '802, the pixels adjacent to the contour are modified for coding the message in the image.

Another disadvantage of conventional approaches is that they do not enable finding the hidden message again once the image has undergone some manipulations (modifications). For example, if the pixels are displaced with respect to one another (geometric manipulation of rotation type, for example) or if they are modified by filtering, compression, etc., there is a significant risk of loosing the encrypted message. Among the most frequent manipulations which are likely to prevent giving back messages, the recentering, a JPEG-type compression before transmission of the image in digital format, or a contrast, luminosity, or image size modification should be mentioned.

The above problem is even more critical when the image undergoes several successive manipulations, which is more and more often the case with image transmissions over digital communication networks.

SUMMARY OF THE INVENTION

The present invention aims at overcoming at least one disadvantage of known techniques. More specifically, the present invention aims at providing a method for inserting at least one binary code in a digital image which enables finding the code(s) even after the image has undergone one or several manipulations.

The present invention also aims at providing a method using conventional image processing techniques enabling its implementation by existing devices.

The present invention also aims at providing a solution which is compatible with the use of conventional image processing algorithms.

To achieve these and other objects, the present invention provides a method for inserting at least one binary code in a digital image, including converting the code into a deformation of contours of objects in the image.

According to an embodiment of the present invention, the method includes the steps of:

detecting object contours of an original image;

isolating the contours from the rest of the image;

calculating the Fourier descriptors of the contours;

modifying the Fourier descriptors of these contours according to the binary code to be inserted in the image; and rebuilding the image while taking the new contours into account.

According to an embodiment of the present invention, the Fourier descriptors corresponding to the respective centers of gravity of the contours are not modified.

According to an embodiment of the present invention, the Fourier descriptors corresponding to the respective scale factors of the contours are not modified.

According to an embodiment of the present invention, only the modules of the Fourier descriptors are modified.

According to an embodiment of the present invention, for each contour which is desired to be modified, a pair of Fourier descriptors is selected, and these descriptors are modified so that their difference is respectively greater or smaller than a predetermined threshold according to whether the stored bit is 1 or 0.

According to an embodiment of the present invention, said threshold is set according to a compromise between the visibility of the modifications on the image and the sensitivity of the code insertion to image manipulations.

According to an embodiment of the present invention, the method is applied to the inserting of an element for identifying or authenticating the considered image.

According to an embodiment of the present invention, the method is applied to the inserting, in the image, of shooting characteristics of this image.

The present invention also provides a method for extracting at least one binary code inserted in a digital image, according to which an extraction algorithm depending on the algorithm used to insert the code is applied to the contours of an image.

The present invention also provides a digital image processing system intended to insert a binary code in an image.

The foregoing objects, features and advantages of the present invention will be discussed in detail in the following non-limiting description of specific embodiments in connection with the accompanying drawings.

DETAILED DESCRIPTION

Figure 1:
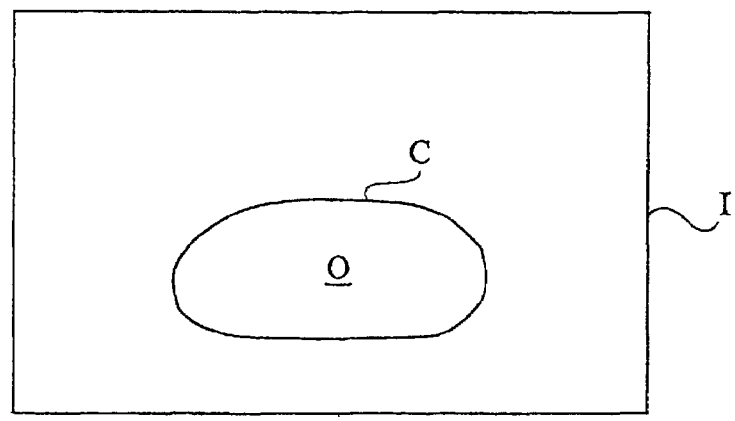
FIG. 1 illustrates, in a very simplified view, an image before insertion of a code or digital message according to the present invention.

The same elements have been designated with the same references in the different drawings. For clarity, only those elements and method steps which are necessary to the understanding of the present invention have been shown in the drawings and will be described hereafter. In particular, the different processing algorithms will not be described in detail since they are well known.

A feature of the present invention is to use the contours of the elements or objects of an image to hide therein the identifiers, or more generally any code or digital message.

Thus, according to the present invention, the image pixels are no longer used, be it directly or indirectly (by modification of the coefficients provided by various transformations), but the contours of the image components are slightly deformed, this deformation representing the inserted message. According to the present invention, the contours are not chosen as such to select areas where the pixels (or coefficients) must be modified, but are selected to be themselves deformed. Reference will sometimes be made to a contour selection to insert the digital message therein. This means, according to the present invention, selecting these contours to insert a message in an image by deforming these very contours.

An advantage of choosing the image contours to insert therein, by modification of these contours, the digital messages, is that this provides a particularly robust solution (against possible piracies or modifications). Indeed, by modifying the image characteristics which bear the very meaning of this image, risks of seeing these characteristics modified by a filtering, a compression or a geometric modification are reduced or minimized. In particular, the contours of the objects of an image are respected by rotation, enlargement, translation, contrast modification, and compression for transmission transformations.

Further, even in the limiting case where an image is distorted to the extent that the message supported by the contour modification is no longer identifiable, this image is no longer usable. Accordingly, the fact that the authentication message has been made imperceptible by a modification introduced by a possible pirate then no longer is a problem in this case.

Figure 2:
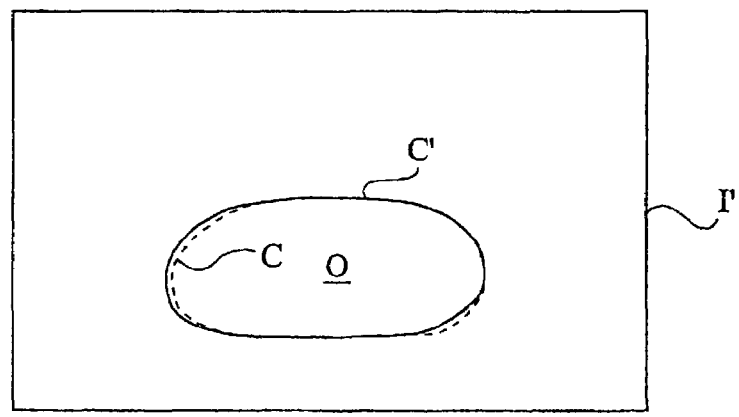
FIG. 2 shows the image of FIG. 1 after insertion of the digital message according to the present invention.

FIGS. 1 and 2 are very simplified representations of images I, respectively I', illustrating the implementation of the insertion method according to the present invention.

FIG. 1 shows an image before implementation of the method. In this image, an object O has been represented by its contour C.

FIG. 2 shows the same image after implementation of the method. Contour C of object O of FIG. 1 has become a contour C' slightly modified in the left-hand and right-hand portion of the drawing. Original contour C of object O is drawn in dotted lines.

Preferably, the code insertion is repeated at several locations in the image, which enables maintaining the identification even if an image is cut. The increased capacity of digital data insertion due to the contour deformation further increases possibilities of code duplication, enabling protecting it, in case of a more significant division of an image than in a conventional case. Further, even if the image is recentered, the word may still be extracted since each piece of image will necessarily contain contours, so that the inserted data will always be present.

According to a preferred embodiment, the image contour modification is performed by using the Fourier descriptors of this image, which are a conventional tool to digitally describe contours. Such Fourier descriptors have the remarkable advantage, with certain precautions, of being invariant both by translation and rotation as well as by a scale change of the image. Accordingly, even if the image has undergone one or several rotations, one or several changes of scale factor, or has been displaced, the data will still be recoverable since the Fourier descriptors used will not be affected by these transformations.

Figures 3A, 3B:
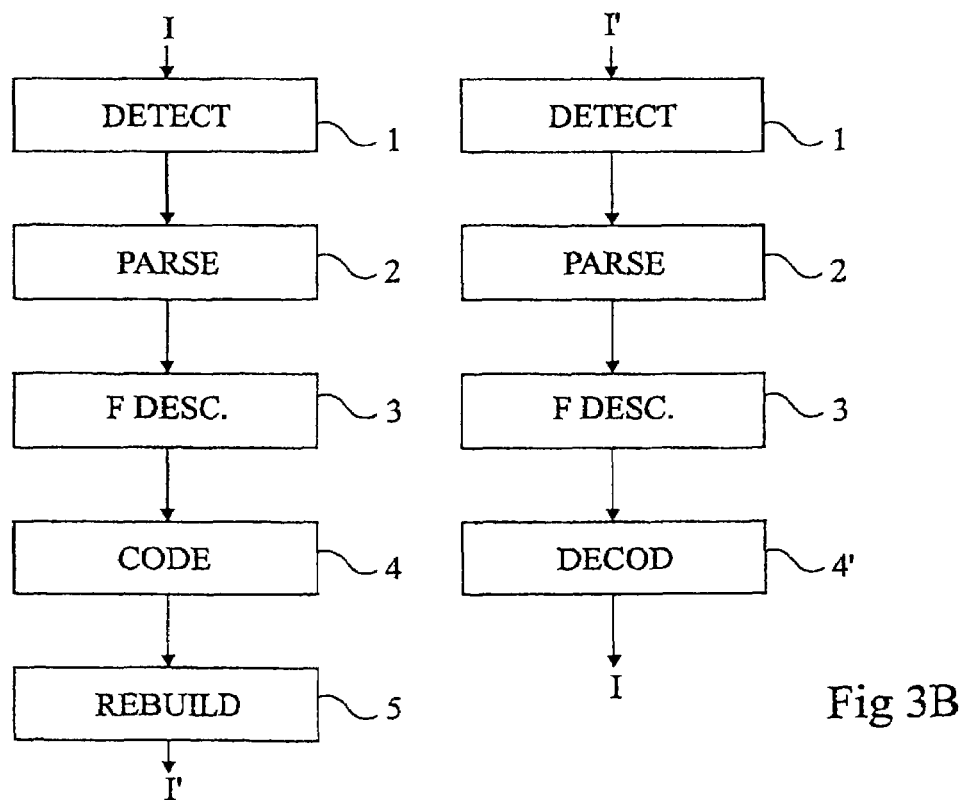
FIG. 3A very schematically illustrates in the form of blocks a mode of implementation of a binary code insertion method according to the present invention.
FIG. 3B very schematically illustrates, in the form of blocks, and implementation of a binary code extraction method according to the present invention.

FIG. 3A shows, in the form of a very simplified flowchart, an embodiment of the method of message insertion in digital images according to the present invention.

Consider, to begin with, original image I in which the contours of the different objects of this image are detected (block 1, DETECT). "Object" of course designates any contour, whatever its nature. This detection can be implemented by conventional contour detection methods. For example, more or less sophisticated filters enabling extracting the contours as well as the textured areas are used.

An example of a conventional contour detection method is described in article "Computational approach to edge detection" by J. Canny, in IEEE "Transactions on Pattern Analysis and Machine Intelligence", November 1986, volume PAMI-8, N°6, pages 679 to 698 which is incorporated herein by reference.

A high-pass filter having, for example, a transfer function h corresponding to the following convolutional matrix may also be used:

$$h = \begin{bmatrix} -1 & -1 & -1 \\ -1 & 8 & -1 \\ -1 & -1 & -1 \end{bmatrix}$$

The image of the contours is then written as C=I*h, where I is the original image and where * is the convolutional operator.

Once the contours have been detected, the contours must be separated from the rest of the image and each contour must be separated from the others. This separation (block 2, PARSE) is performed line by line by comparing each pixel to its neighbors.

A binary image of the contours is first obtained by merely thresholding the pixel values. Then, assuming that a pixel belonging to a contour is identified by a bit 1, for each image pixel, it is checked whether it is a contour pixel. If so, if a pixel next to the current pixel already belongs to a contour $C_1$ (i representing the arbitrary rank of the contour among the m image contours), then the current pixel also belongs to this contour $C_1$. If not, a new contour $C_{i+1}$ is created and the current pixel belongs to this new contour.

The next step (block 3, FDESC) includes calculating for each new contour Ci the corresponding Fourier descriptors $Z_k$. This corresponds, for k ranging between $-(n/2)+1$ and $n/2$ (n representing the number of pixels in the contour), to applying the following formula:

$$Z_k = \sum_{p=0}^{n} (z_p \cdot \exp^{(-2\pi jpk)}), \quad \text{(formula 1)}$$

where $z_p$ is the complex number associated with pixel p of the considered contour ($z_p = x_p + j \cdot y_p$) and where j represents the imaginary part of a complex number.

According to the present invention, at the next step (block 4, CODE), the contours are modified by modifying their descriptors.

To have a robust system, descriptor $Z_0$ corresponding to the center of gravity of the Fourier descriptors is not modified. Indeed, it is the only coefficient which is not invariant by translation, all the others being so. Further, it is also avoided to modify descriptor $Z_1$ which corresponds to the scale factor. Finally, to make the coding insensitive to rotations of the image, only the modules of descriptors $Z_k$ are considered.

In other words, according to a preferred embodiment of the present invention, the modules of descriptors $Z_k$ are modified for $k \neq 0$ and 1 only.

Various conventional methods may be implemented to code a binary message by modification of the above-described coefficients. The choice of the method depends on the application and especially on the length of the messages to be inserted in the images.

According to a preferred embodiment enabling blind extraction of the inserted data, that is, without any knowledge of the original image or of the code to be extracted, the coding is performed as follows.

For each contour $C_1$, a pair of coefficients ($Z_q$, $Z_r$) is selected, q and r being selected, for example, by applying a secret key and by using a random number generator. Ranks q and r of the selected coefficients are preferably sufficiently high (for example, greater in absolute value than 3) to avoid modifying the low frequencies of the contour, which would make the modification visible. They must, in addition, not be too high (for example, smaller in absolute value than $1/(5n)$, n being the number of pixels of the contour), to avoid for a mere low-pass filter to erase the information contained in the considered coefficient.

For each bit of the contour, the following transformations are then performed:

if the bit is equal to 1 and if $Z_q < Z_r + T$, where T is a positive constant, $Z_q$ and $Z_r$ are modified to obtain $Z_q > Z_r + T$ (for example, $Z_q = Z_r + T$ is calculated).

if the bit is equal to 0 and if $Z_q > Z_r - T$, $Z_q$ and $Z_r$ are modified to obtain $Z_q < Z_r - T$ (for example, $Z_q = Z_r - T$ is calculated).

Constant T enables setting the visibility and the robustness of the insertion. The greater T is, the less risk there is for $Z_q - Z_r$ to switch signs due to image manipulations, and thus the more the insertion is robust. The smaller T is, the less the modifications (deformations) of the contours will be significant, and thus the less visible they will be on final image I'. A compromise between the robustness and the visibility is thus performed according to the applications.

To hide several bits in a same contour, it is enough to apply, according to the above-described method, the transformation to several coefficient pairs.

Once the contours have been deformed by modification of the Fourier descriptors, the image is reconstituted (rebuilt). Indeed, the image information (color, contrast, etc.) of the pixels located at the border of the original contours which have been modified (more specifically, some pixels alongside each contour in the original image have had their features modified to become the pixels of a deformed contour) has been lost. The rebuilding (block 5, REBUILD) consists of modifying the pixels comprised between the initial contours and the modified contours so that both sides of the new contours are deformed in the same way as have the contours. In other words, the image is filled to come as close as possible to the initial filling of the borders of the modified contours.

An example of a method for modifying an image according to the displacement of given pixels which can be used as a model to modify the filling up (neighboring of the contours) after modification of the original contours is described in U.S. Pat. No. 5,175,808 which is incorporated herein by reference.

FIG. 3B illustrates, in a very simplified flowchart, an example of a method for decoding data inserted in a digital image according to the present invention.

Consider, to begin with, coded image I'. If the Fourier descriptors of the contours have remained available since the message insertion, a decoding (block 4', DECODE) or an extraction is performed by applying an adapted algorithm depending on the coding. Otherwise, contours C' are searched (block 1, DETECT), after which the detected contours are separated from the rest of the image (block 2, PARSE) and the Fourier descriptors of each contour $C'_1$ are calculated (block 3, FDESC). These three possible previous steps are the same as upon insertion (FIG. 3A).

The decoding includes extracting, from contours C', the digital data which do not correspond to the original image but which contain the inserted code.

Referring to the example of coefficient pairs ($Z_q$, $Z_r$), it is enough to generate the involved coefficient pair and to calculate value $Z_q - Z_r$. According to the sign of this value, the hidden bit is equal to 1 or 0 ($Z_q - Z_r > 0$ means a bit at 1, $Z_q - Z_r < 0$ means a bit at 0).

A advantage of marking the images by a simple coding of coefficient pairs is that this enables a much easier reading of the message inserted in the image upon decoding.

The steps of an insertion and extraction method according to the present invention may be performed successively for each contour, but will preferentially be performed for an entire image before proceeding to the next image, by using conventional storage means.

Of course, the present invention is likely to have various alterations, modifications, and improvements which will readily occur to those skilled in the art. In particular, the present invention applies whatever the type of message(s) which are desired to be inserted in an image and whatever the type of considered images, provided that they can be digitally coded.

Further, various algorithms may be used instead of those indicated in the present description, an advantage of the present invention being to enable use of conventional algorithms.

Further, not all the contours of an image are necessarily processed. The selection of the contours in which the code is to be inserted or in which different codes are to be inserted may be random or defined by an algorithm taking into account, for example, the contour lengths.

Finally, the present invention may be implemented by using conventional tools (hardware and software), the necessary adaptations of which, to respect the sequencing of the processings provided by the present invention, are within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for inserting at least one binary code in a digital image comprising converting the code into a deformation of contours of objects in the image, the deformation of contours comprising an alteration of shape of contours of objects in the image, including the steps of:
    detecting contours of objects in an original image;
    isolating the contours from the rest of the image;
    calculating Fourier descriptors of the contours;
    modifying the Fourier descriptors of these contours according to the binary code to be inserted in the image; and
    rebuilding the image while taking the new contours into account.

2. The method of claim 1, wherein the Fourier descriptors corresponding to the respective centers of gravity of the contours are not modified.

3. The method of claim 1, wherein the Fourier descriptors corresponding to the respective scale factors of the contours are not modified.

4. The method of claim 1, wherein only the modules of the Fourier descriptors are modified.

5. The method of claim 1, including, for each contour which is desired to be modified, the steps of:
    selecting a pair of Fourier descriptors; and
    modifying these descriptors so that their difference is respectively greater or smaller than a predetermined threshold according to whether the stored bit is 1 or 0.

6. The method of claim 5, wherein said threshold is set according to a compromise between the visibility of the modifications on the image and the sensitivity of the code insertion to image manipulations.

7. The method of claim 1, applied to the insertion of an element for identifying or authenticating the considered image.

8. The method of claim 1, applied to the insertion, in the image, of shooting characteristics of this image.

9. A method for extracting at least one binary code inserted in a digital image by implementing the method of claim 1, comprising applying, to the contours of an image, an extraction algorithm depending on the algorithm used to insert the code.

10. A digital image processing system intended to insert a binary code in an image, including means for implementing the method of claim 1.

* * * * *